United States Patent
Sameit et al.

(10) Patent No.: US 11,252,578 B2
(45) Date of Patent: Feb. 15, 2022

(54) 3D SPECTRUM MEASUREMENT AND MAPPING

(71) Applicant: SMARTSKY NETWORKS LLC, Morrisville, NC (US)

(72) Inventors: Paul Sameit, Waxhaw, NC (US); Koichiro Takamizawa, Silver Spring, MD (US)

(73) Assignee: SmartSky Networks, LLC, Morrisville, NC (US)

( * ) Notice: Subject to any disclaimer, the term of this patent is extended or adjusted under 35 U.S.C. 154(b) by 0 days.

(21) Appl. No.: 16/978,295

(22) PCT Filed: Mar. 7, 2019

(86) PCT No.: PCT/US2019/021109
§ 371 (c)(1),
(2) Date: Sep. 4, 2020

(87) PCT Pub. No.: WO2019/173567
PCT Pub. Date: Sep. 12, 2019

(65) Prior Publication Data
US 2021/0006982 A1     Jan. 7, 2021

Related U.S. Application Data

(60) Provisional application No. 62/639,539, filed on Mar. 7, 2018.

(51) Int. Cl.
*H04W 16/14* (2009.01)
*H04W 16/18* (2009.01)

(52) U.S. Cl.
CPC ........... *H04W 16/14* (2013.01); *H04W 16/18* (2013.01)

(58) Field of Classification Search
CPC .............................. H04W 16/14; H04W 16/18
See application file for complete search history.

(56) References Cited

U.S. PATENT DOCUMENTS

2008/0102813 A1   5/2008   Chari et al.
2012/0032854 A1*   2/2012   Bull ....................... H04K 3/224
                                                                                342/450

FOREIGN PATENT DOCUMENTS

WO     2010077790 A1    7/2010

OTHER PUBLICATIONS

International Search Report and Written Opinion from International Application No. PCT/US2019/021109 dated Nov. 6, 2019, all enclosed pages cited in its entirety.

* cited by examiner

*Primary Examiner* — Marcus Hammonds
(74) *Attorney, Agent, or Firm* — Burr & Forman, LLP

(57) ABSTRACT

A spectral mapping module may include processing circuitry configured to receive spectral activity information from one or more assets that have flown through an area. The spectral activity information may be associated with location information indicating a respective location at which each portion of the spectral activity information was obtained. The processing circuitry may be further configured to associate the spectral activity information with respective volumetric elements that are each associated with respective portions of the area, determine spectral activity indicators for each of the respective volumetric elements that has spectral activity information associated therewith, and generate display data including the spectral activity indicators.

20 Claims, 10 Drawing Sheets

3D SPECTRUM MEASUREMENT AND MAPPING

CROSS REFERENCE TO RELATED APPLICATIONS

This application claims priority to U.S. application No. 62/639,539 filed Mar. 7, 2018, the entire contents of which are hereby incorporated by reference in its entirety.

TECHNICAL FIELD

Example embodiments generally relate to wireless communications and, more particularly, relate to a system for measuring and mapping spectrum usage in a three dimensional (3D) environment.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

The ability to stay connected while being mobile has long been expected by individuals in their daily lives. However, in spite of the familiarity that people have with remaining continuously connected to networks while on the ground, people have generally understood that easy and/or cheap connectivity stops once an aircraft is boarded. That situation is rapidly changing. Maintaining connectivity, even in the air, will revolutionize travel and business, but will also make the airborne environment a much more crowded space in terms of the numbers and powers of the signals that will fill our skies.

With the expectation for increased spectral activity in our skies, the potential for interference also increases. The ability to provide effective wireless communication on aviation platforms could therefore likely experience a benefit from the ability to understand the communication environment in a very detailed way. Such understanding of the communication environment can also enable devices to respond to the understanding gained in a way that minimizes interference or maximizes network efficiency.

Accordingly, it may be desirable to provide a system and or devices that are capable of performing 3D spectrum measurement and mapping as described herein.

BRIEF SUMMARY OF SOME EXAMPLES

Some example embodiments may therefore be provided to enhance the ability of systems and/or devices to provide, process and/or utilize data that is gained through any of a number of ways, by any of a number of aircraft or other assets, relating to spectral activity in a given area. The improved ability to determine spectral activity may then contribute, for example to improving communication performance of devices, or to numerous other situational awareness or even battle space preparation related activities.

In one example embodiment, a spectral mapping module may be provided. The spectral mapping module may include processing circuitry configured to receive spectral activity information from one or more assets that have flown through an area. The spectral activity information may be associated with location information indicating a respective location at which each portion of the spectral activity information was obtained. The processing circuitry may be further configured to associate the spectral activity information with respective volumetric elements that are each associated with respective portions of the area, determine spectral activity indicators for each of the respective volumetric elements that has spectral activity information associated therewith, and generate display data including the spectral activity indicators.

In another example embodiment, a wireless communication network is provided. The wireless communication network may include a plurality of base stations configured to communicate with one or more in-flight assets, each of the in-flight assets comprising a spectral activity monitor, and a spectral mapping module configured to receive spectral activity information from the spectral activity monitor of each of the in-flight assets and generate display data based on the spectral activity information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5A:
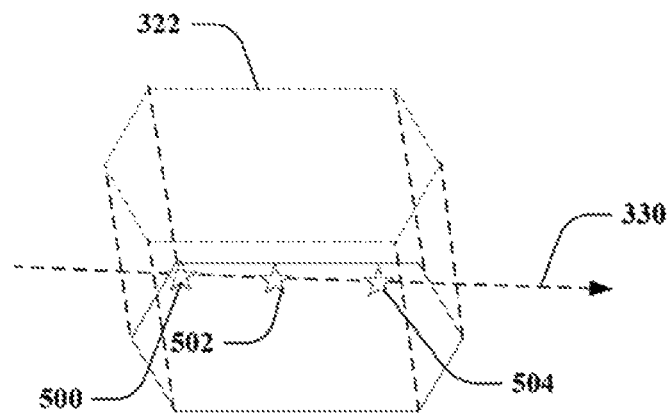
Figure 5B:
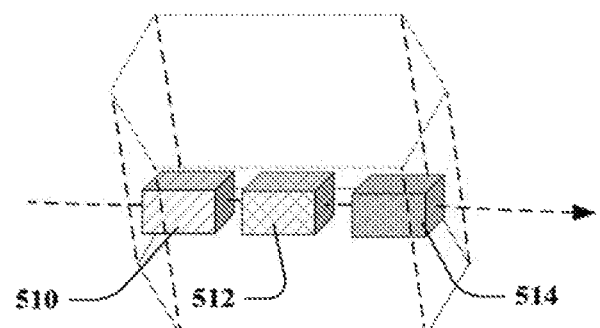
Figure 5C:
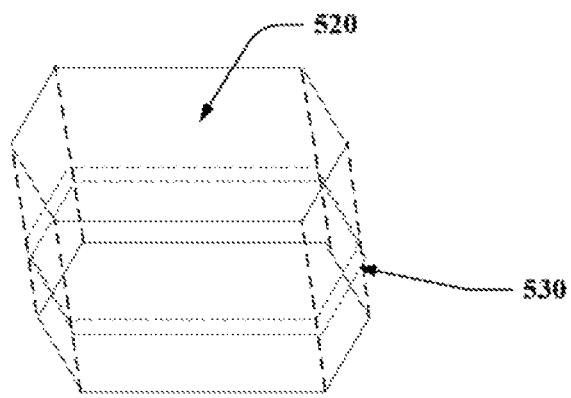
Figure 6:
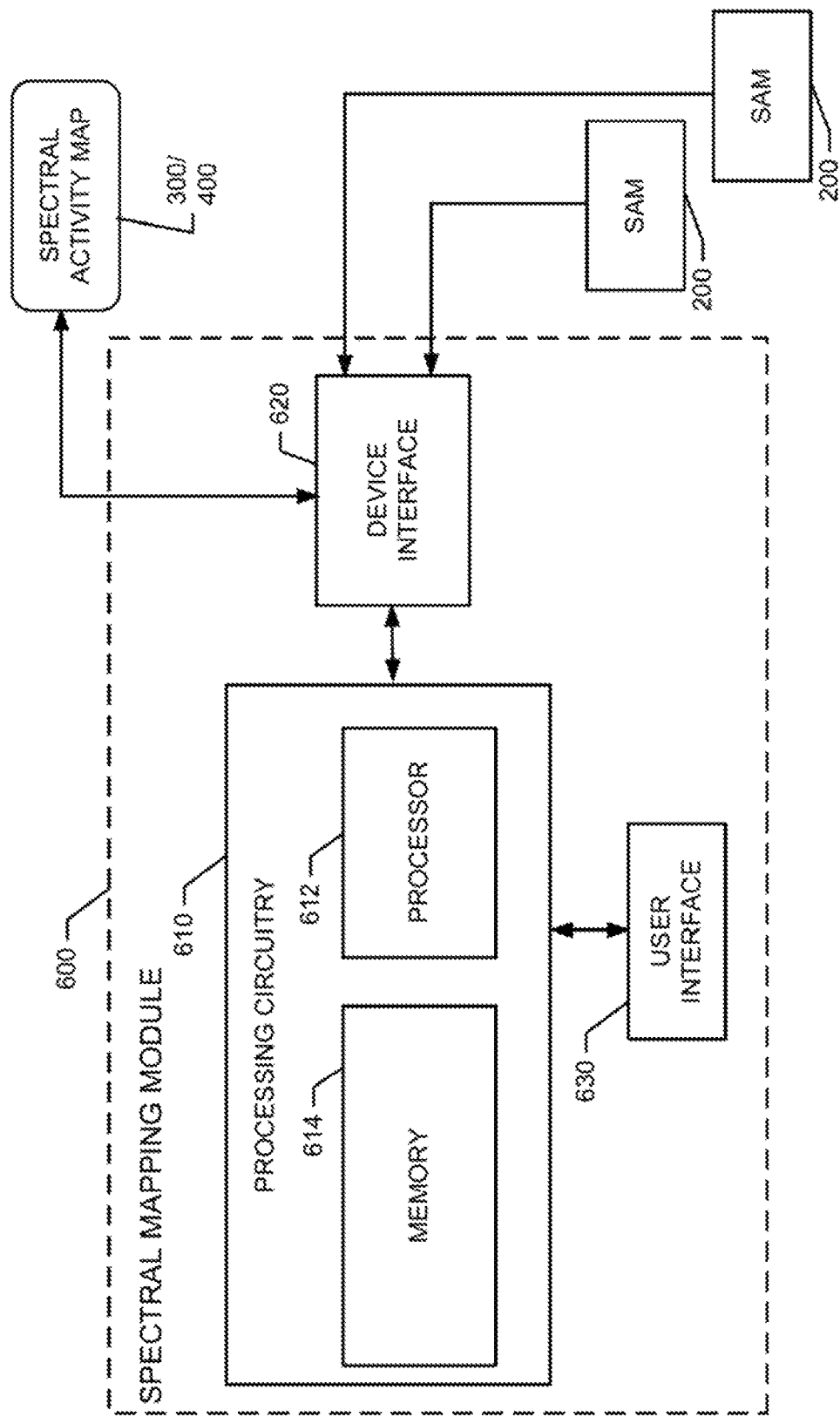
Figure 7:
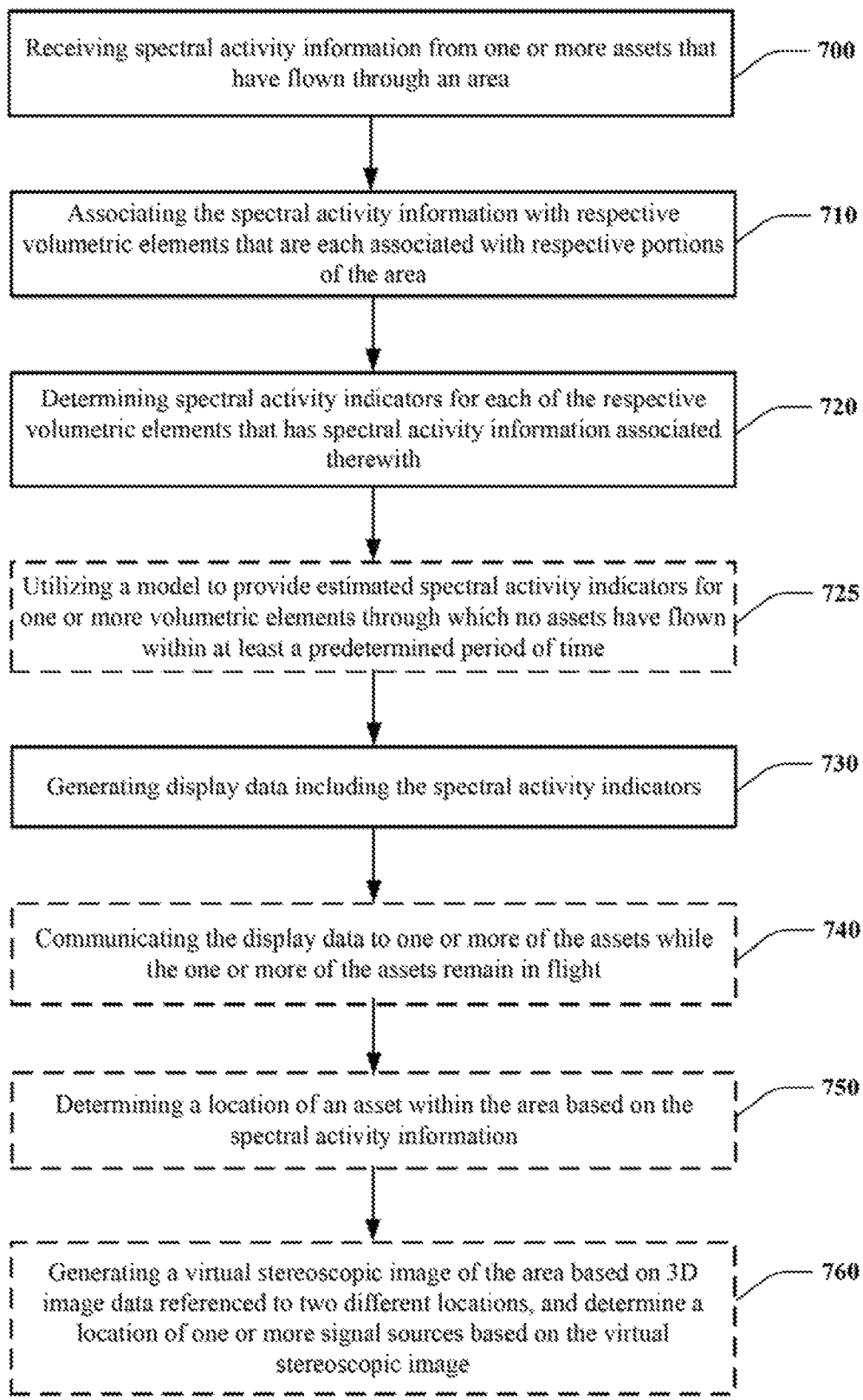
Figure 8:
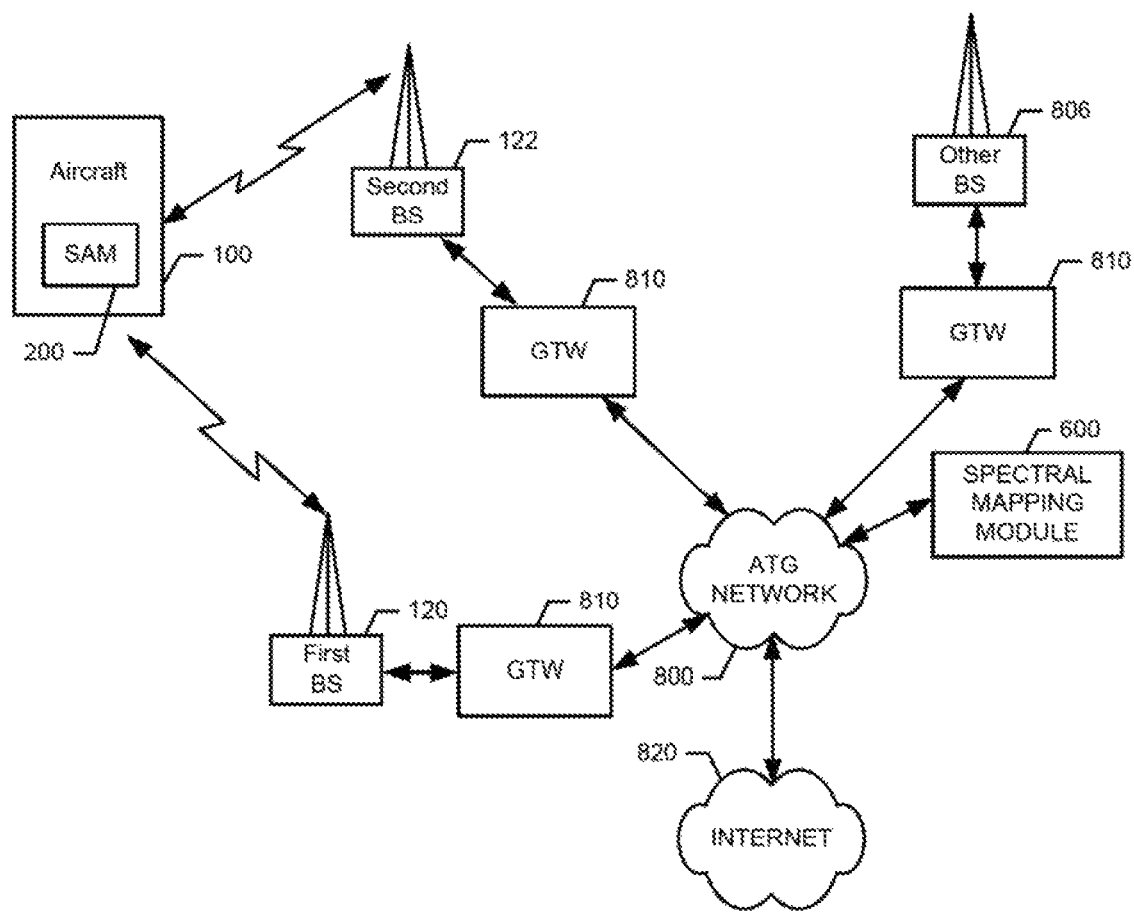

FIG. 5, which is defined by FIGS. 5A, 5B, and 5C illustrates an individual volumetric element and how data aggregation is performed in accordance with an example embodiment;

FIG. 6 illustrates a block diagram of a spectral mapping module in accordance with an example embodiment;

FIG. 7 illustrates a block diagram of a method of processing spectral activity information according to an example embodiment; and FIG. 8 illustrates a block diagram of an ATG network that may allow real time communication of spectral activity information in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. As used herein, a "steerable beam" should be understood to be a beam that, once formed, can be deflected or steered to a desirable direction, or a series of beams that are relatively fixed in direction and that can be sequentially formed in their respective fixed directions to track the movement of an aircraft such that the aircraft is effectively tracked by a "steered" beam that in reality is generated by a series of beam handovers between the sequentially formed fixed beams. The formation of either of these types of steerable beams is generally accomplished via "beamforming." Thus, use of any such terms should not be taken to limit the spirit and scope of example embodiments.

As used herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

As mentioned above, example embodiments may provide an improved understanding of the spectral activity in a given area. To accomplish this, example embodiments may utilize the information that can be gathered from any assets (e.g., aircraft or other communication devices) that pass through the given area to build a model of the spectral activity in the given area. In this regard, for example, each of a plurality of different assets could record and/or report (e.g., in real time) the spectral activity in their individual locations to one or more devices that are configured to receive all such data and aggregate the data to make it useful for further analysis and/or consumption. In some cases, the spectral activity information may be normalized to one or more reference points (with or without the aid of global positioning system (GPS) location information) and may be inserted into a modeling system that generates a 3D map of the spectral activity in a given area. The 3D map may allow identification of spectral "white space" where communications can be shifted to avoid interference and/or can be used to take other actions in present or future time to avoid or mitigate interference or otherwise improve communication effectiveness or network efficiency.

Example embodiments may use data gathered by routine air traffic in a given area to help characterize the spectral activity in the area in the normal course of operations. In this regard, for example, antennas that normally operate anyway within an area can be used to report on the spectral activity in the area so that planning and adjustments can be made to improve the ability of assets in the area to communicate with each other and/or with devices on the ground. The spectral activity may be mapped in 3D to provide a spectral map of the entire volume of a given area from above ground to a predetermined altitude. In some cases, the use of multiple antennas (either in reality or virtually (due to movement of antennas in the area)) may allow stereographic data to be captured that can make location determination relatively easy and accurate to determine for sources of signals detected. The existence of interfering and non-interfering signals (relative to any particular use of interest) may therefore be learned, determined or understood relative to a given area and further characterization of aspects of the area can be learned. For example, the location (or at least estimated location) of radar, radio, television, wireless communication transmitters, and/or the like may be determined based on the interference signals or other spectral activity recorded in an area.

Similar capabilities could also be employed in military applications to determine specific countermeasures that may be useful in a given area, and to determine the types and locations of transmitters deployed in the given area. Moreover, drones or other military aircraft operating in a region can deploy LIDAR, FLIR or other assets to facilitate battle space preparation, and/or real time situational awareness for operational equipment and personnel in the given area. Effectively, a robust understanding of the spectral activity can be gained using any number of cooperating contributors that report (e.g., in real time) the spectral activity that is experienced at their own respective locations. One or more assets may be in communication with the cooperating contributors to essentially act as a crowd sourcing entity that collects, aggregates, processes or otherwise utilizes all of the information provided to enable real time control of assets and 3D mapping of the EMI, radar, or other spectral activities in an area. The ability to characterize the spectral activity in the area (i.e., spectral characterization of the area) may further enable intelligent control of communication systems, weapon systems, or other equipment in real or future time. Spectral activity in an area could also be used to enable navigation based entirely, or at least partially, on spectral information.

Figure 1:
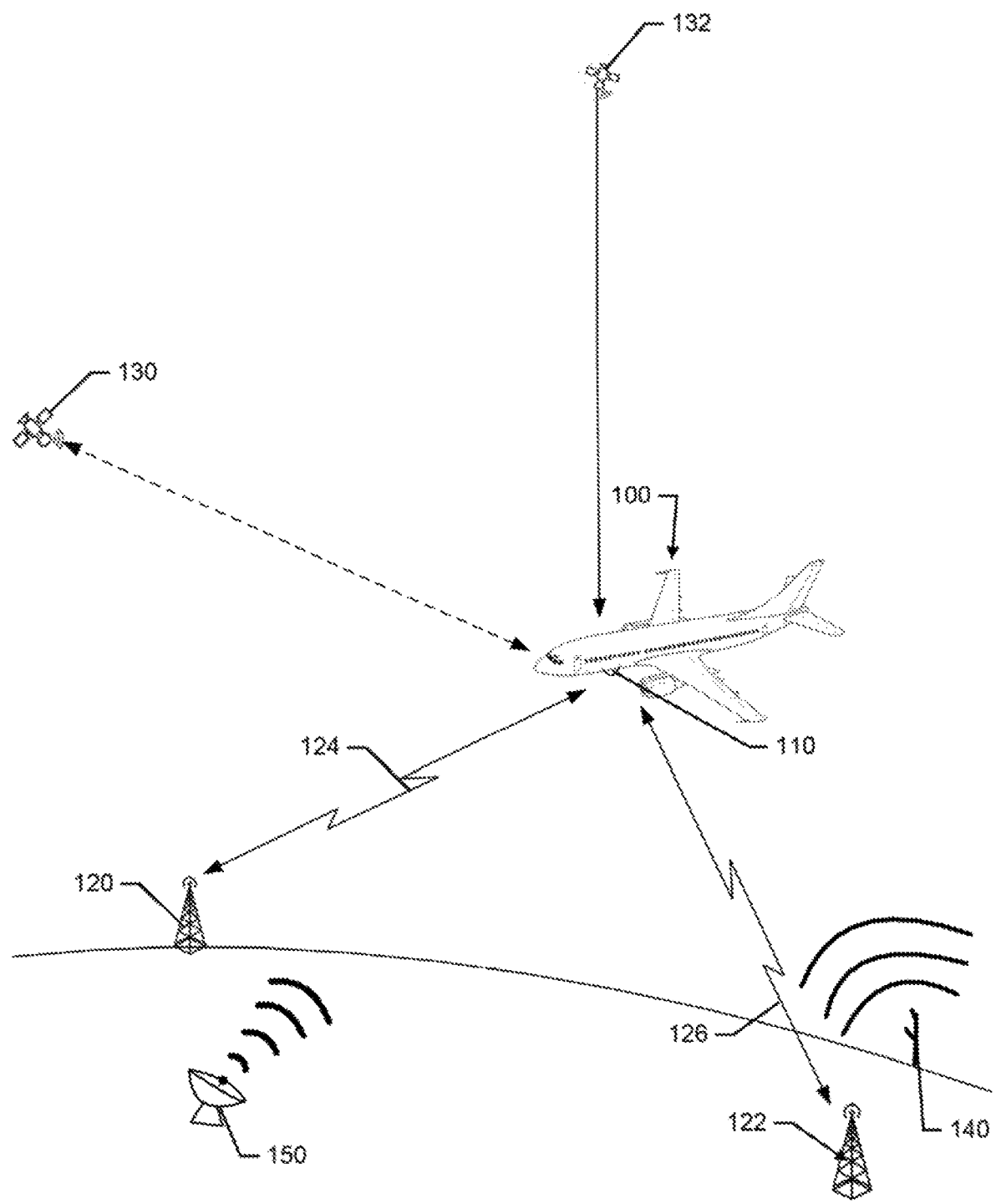
FIG. 1 illustrates an aircraft receiving spectral activity from a number of sources in accordance with an example embodiment.

FIG. 1 illustrates a typical (albeit simplified) environment in which an example embodiment may operate. Referring to FIG. 1, an aircraft 100 may be flying at any altitude over the ground. The aircraft 100 may be an example of an asset in connection with which example embodiments may be practiced. The aircraft 100 may include an antenna assembly 110 including one or more antennas. The antennas of the antenna assembly 110 may be collocated at a single assembly, or they may be spaced apart from each other making the antenna assembly 110 much more of a "virtual" assembly than a single physical component or collection of components. Moreover, in some cases, a single configurable antenna may act as the antenna assembly 110. Thus, the term antenna assembly 110 is merely used to discuss all potential signal receivers, sensors or detectors that may be included on the aircraft 100, regardless of their physical location and form factor.

The antennas of the antenna assembly 110 may be configured to communicate with any of a number of different transmitters and/or receivers associated with one or more communication networks or positioning systems. For example, the antenna assembly 110 may include one or more antennas configured to communicate with one or more ground-based transmitters. In this regard, for example, the antenna assembly 110 may include antennas configured to communicate with an air-to-ground (ATG) communication network via a first base station 120 and a second base station 122 via respective wireless communication links 124 and 126. However, it should be appreciated that the first and second base stations 120 and 122 could alternatively be associated with other networks or systems.

The antennas of the antenna assembly 110 could also or alternatively be configured to communicate with satellites. For example, communication satellite 130 may be a part of a satellite communication network that is configured to provide a wireless communication link to the aircraft 100 and/or to communication devices on the aircraft 100. The antennas of the antenna assembly 110 may also be capable of communication with GPS (or other positioning) satellites such as GPS satellite 132.

The signals associated with the first and second base stations 120 and 122, the communication satellite 130, and the GPS satellite 132 may all be "desirable" signals or intentionally received or transmitted signals from the perspective of the aircraft 100. However, other radio frequency (RF) or even signals associated with other frequency spectra may also be received or detectable at the aircraft 100 (and particularly at the antenna assembly 110). For example, noise or other signals from various additional ground transmitters such as ground transmitter 140 may also be received at the aircraft 100. The ground transmitter 140 may represent a transmitter associated with weather systems, research systems, terrestrial communication systems, radio and television networks, and/or the like. Additionally, RF or other transmissions may be received from radar transmitters such as radar transmitter 150.

Figure 2:
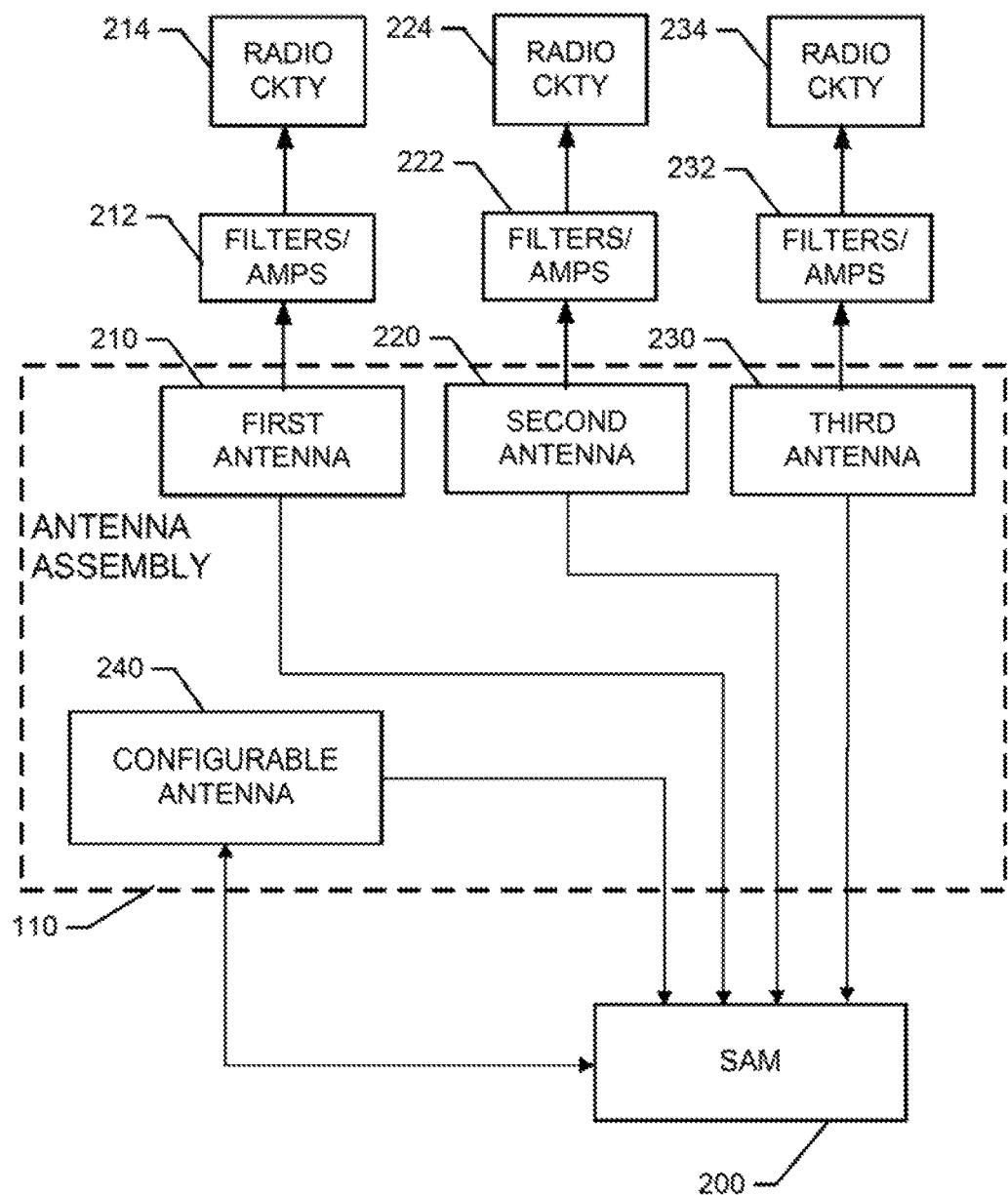
FIG. 2 illustrates a block diagram of an antenna assembly in accordance with an example embodiment.

In an example embodiment the aircraft 100 may transit the area shown in FIG. 1, and numerous other areas, while detecting transmissions from all transmitters in the corresponding area. In this regard, for example, the antenna assembly 110 may be operably coupled to a spectral activity monitor (SAM) 200, as shown in FIG. 2. As shown in FIG. 2, the SAM 200 may receive raw data indicative of signals received at any and all sensors, detectors and/or antennas of the antenna assembly 110. Thus, for example, the antenna assembly 150 may include any or all of a first antenna 210, a second antenna 220, a third antenna 230, and a configurable antenna 240. The first antenna 210 may be configured to receive (e.g., via filters/amplifiers 212) specific signals associated with a radio circuitry 214 associated with a terrestrial-based communication system (e.g., an ATG network). The first antenna 210 may also be configured to transmit signals associated with the terrestrial-based communication system, but such configuration is not required. The second antenna 220 may be configured to receive signals associated with a satellite-based communication system (e.g., a satellite network or GPS satellite). The second antenna 220 may be configured to pass specific signals (via filters/amplifiers 222) to radio circuitry 224 associated with the satellite-based communication system. As noted above, the second antenna 220 may also be configured to transmit signals associated with the satellite-based communication system, but such configuration is not required. The third antenna 230 may be configured to receive specific signals associated with any other transmitter via corresponding filters/amplifiers 232 to pass such signals on to radio circuitry 234 also associated with the corresponding transmitter.

As noted in FIG. 2, the SAM 200 may receive an unfiltered input from the antennas, so that any signals picked up by the antennas can be detected by the SAM 200. This may enable the SAM 200 to extract data without requiring any specific configuration or modification of the first, second and third antennas 210, 220 and 230. The SAM 200 may sample data from each of the antennas sequentially or receive data from all three in parallel in a continuous fashion. In still other examples, the SAM 200 may be configured to sample data according to a schedule that may either be random or may be predetermined.

If included, the configurable antenna 240 may be configurable (e.g., via software, hardware, and/or physical structure changes) to receive different frequencies. Thus, spectral activity information (e.g., noise and signals (coherent and incoherent) and/or the power levels of measured signals/noise associated with the spectral activity) may be detected by the configurable antenna 240 over a potentially wide range of frequencies. The configurable antenna 240 may be manually or automatically reconfigured to any one of its possible configurations. Thus, for example, the configurable antenna 240 could be configured to cycle through any desirable series of configurations, gathering spectral activity information at each respective configuration and corresponding frequency (or frequency band). The cycling of configurations may be through a predetermined sequence of configurations or a randomly selected series of configurations. However, as noted above, in some cases the configurations can be manually selected. Moreover, different modes for configuration changes (e.g., a random mode, modes corresponding to specific frequencies or bands of interest, or modes configured to cover large swaths of spectrum within a given time period) may be programmed into the configurable antenna 240 (or a controller associated therewith) and executed.

Regardless of the programming of the configurable antenna 240 (if included), spectral activity information may be gathered from each respective antenna of the antenna assembly 110 and recorded in connection with both time and location at which such spectral activity information is gathered by the SAM 200. The SAM 200 may then begin to build a database that includes spectral activity information that is associated with both time and location data. The location data may be provided from any suitable source, including GPS or assisted GPS that uses ATG or other base stations to enhance the accuracy of GPS positioning. The SAM 200 may also, receive such data from other assets so that a comprehensive picture of the spectral activity can be created in a 3D environment that can be updated and/or shared with assets in real time or nearly in real time. In other words, one or more assets may have SAMS 200, but other assets may not. The assets that do not have SAMs 200 may communicate data to any asset that has a SAM 200 and the SAM 200 of such asset may record all data in associate with the asset providing the data and its respective location to facilitate building a comprehensive picture of spectral activity. This comprehensive picture may, in some cases, be graphically displayed in the form of a 3D spectral activity map, an example of which is shown in FIG. 3, which is defined by FIGS. 3A, 3B and 3C.

FIG. 3 illustrates a concept drawing of one possible instantiation for a 3D spectral activity map 300 of an example embodiment. The spectral activity map 300 is shown to include data generated by the aircraft 100 of FIG. 1, but it should also be appreciated that any number of additional assets could also contribute data to the generation of the spectral activity map 300. Accordingly, a second aircraft 310 is shown in FIG. 3 merely to illustrate the potential for multiplicity. However, the numbers of assets could be quite a bit higher, or could include just a single asset in various different examples. Moreover, it should be appreciated that any type of asset could be substituted for the aircraft shown (which happen to include a commercial airliner (aircraft 100) and a business jet (second aircraft 310). Thus, for example, the assets could include drones, missiles, military aircraft, balloons, or any other suitable airborne platform.

Figure 3A:
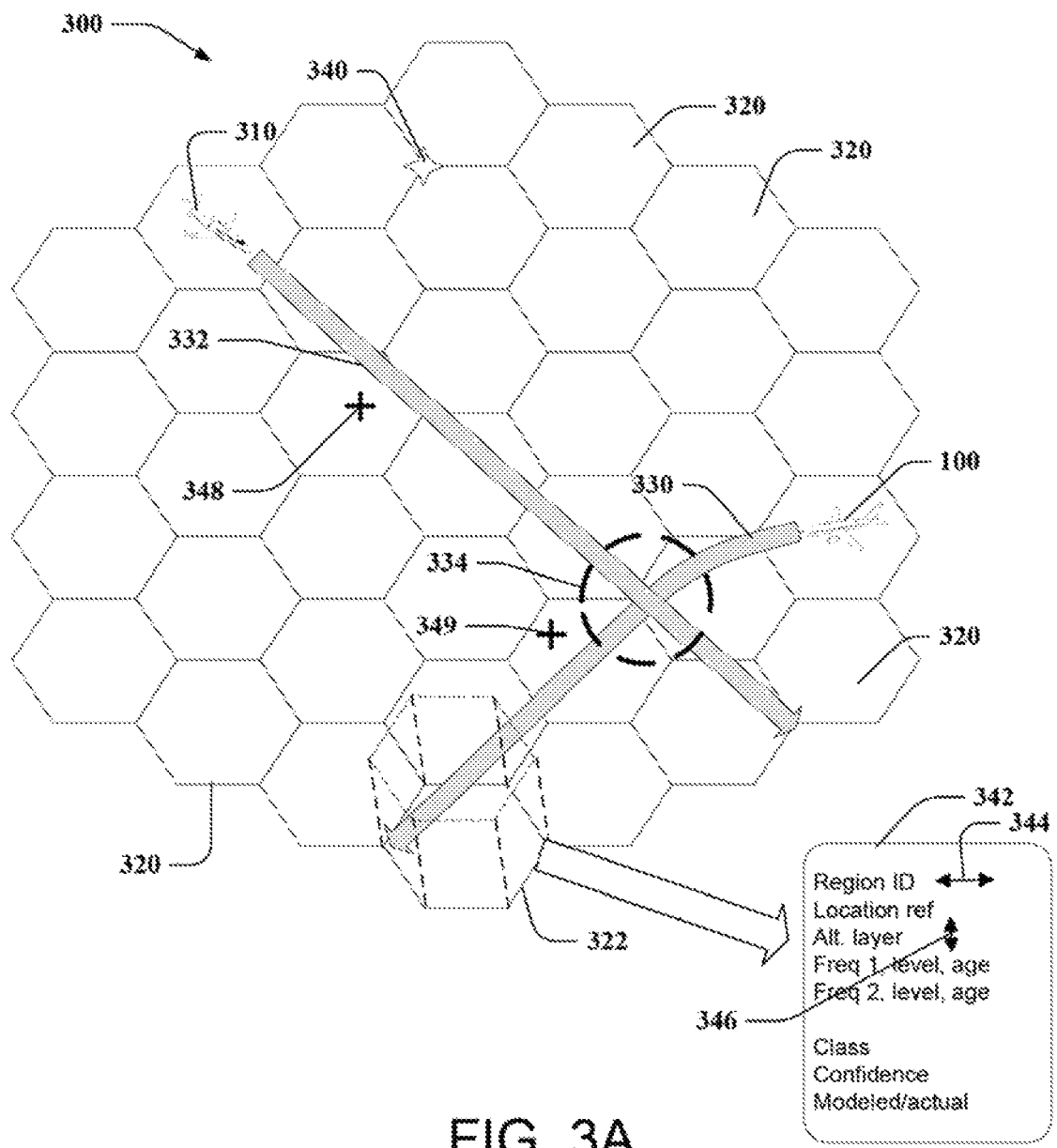
FIG. 3A illustrates a spectral activity map according to an example embodiment.
Figure 3B:
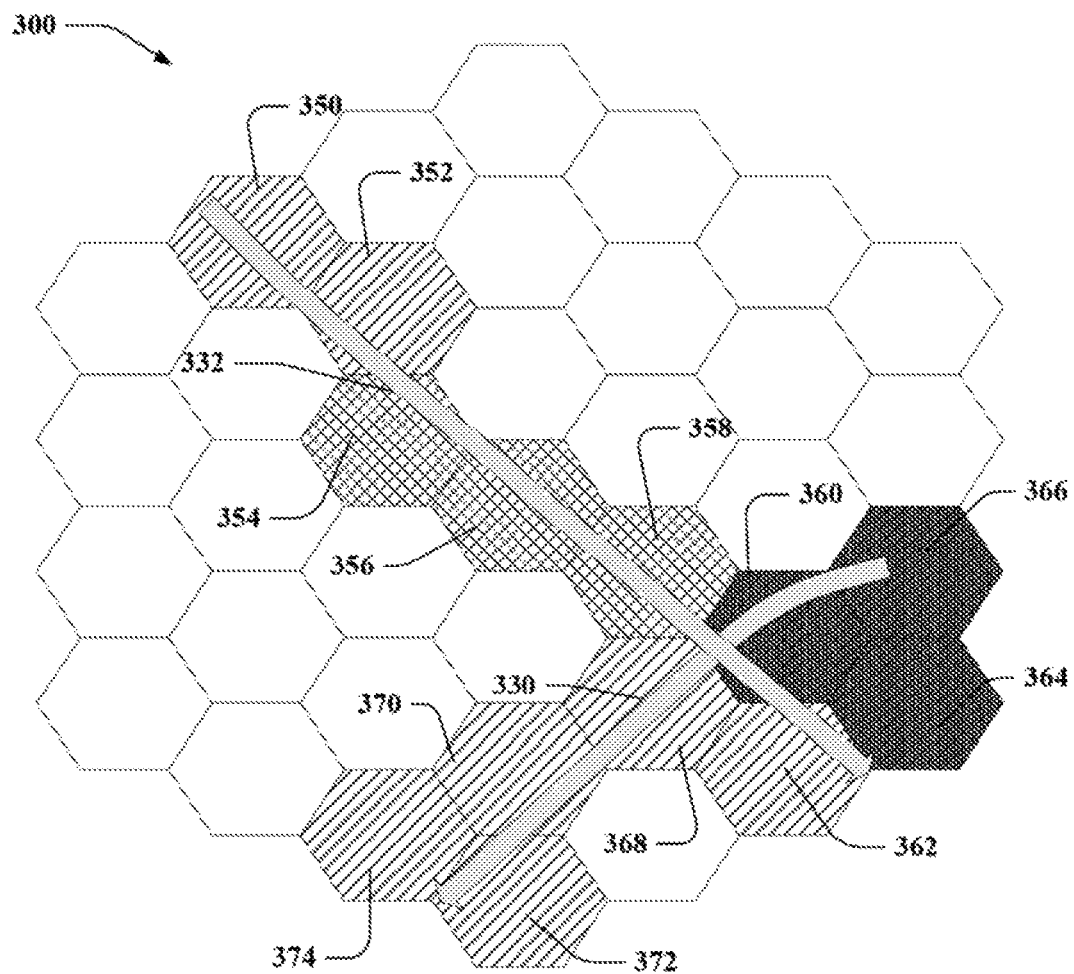
FIG. 3B illustrates spectral activity indicators on the spectral activity map according to an example embodiment.
Figure 3C:
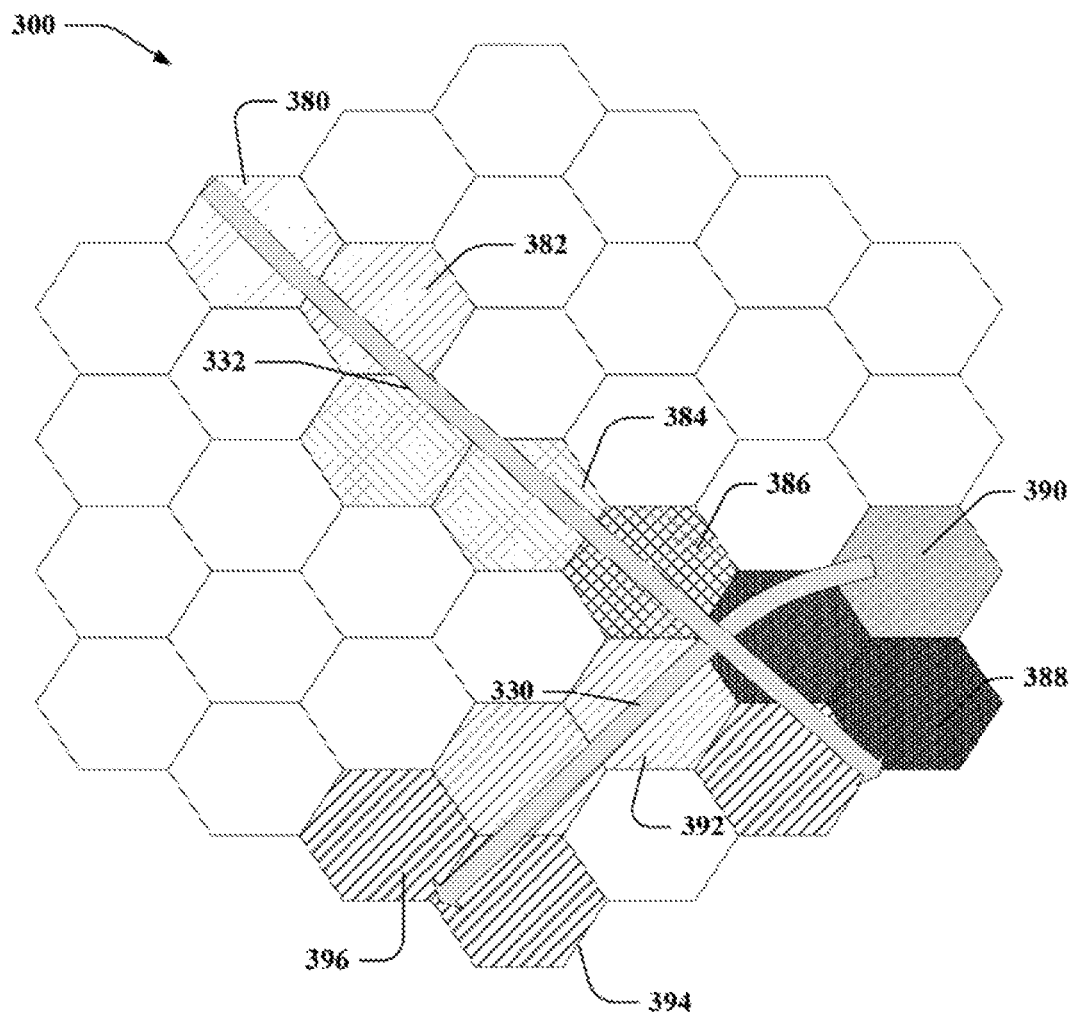
FIG. 3C illustrates the application of characteristics to spectral activity indicators to illustrate the age of data shown on the spectral activity map according to an example embodiment.
Figure 4:
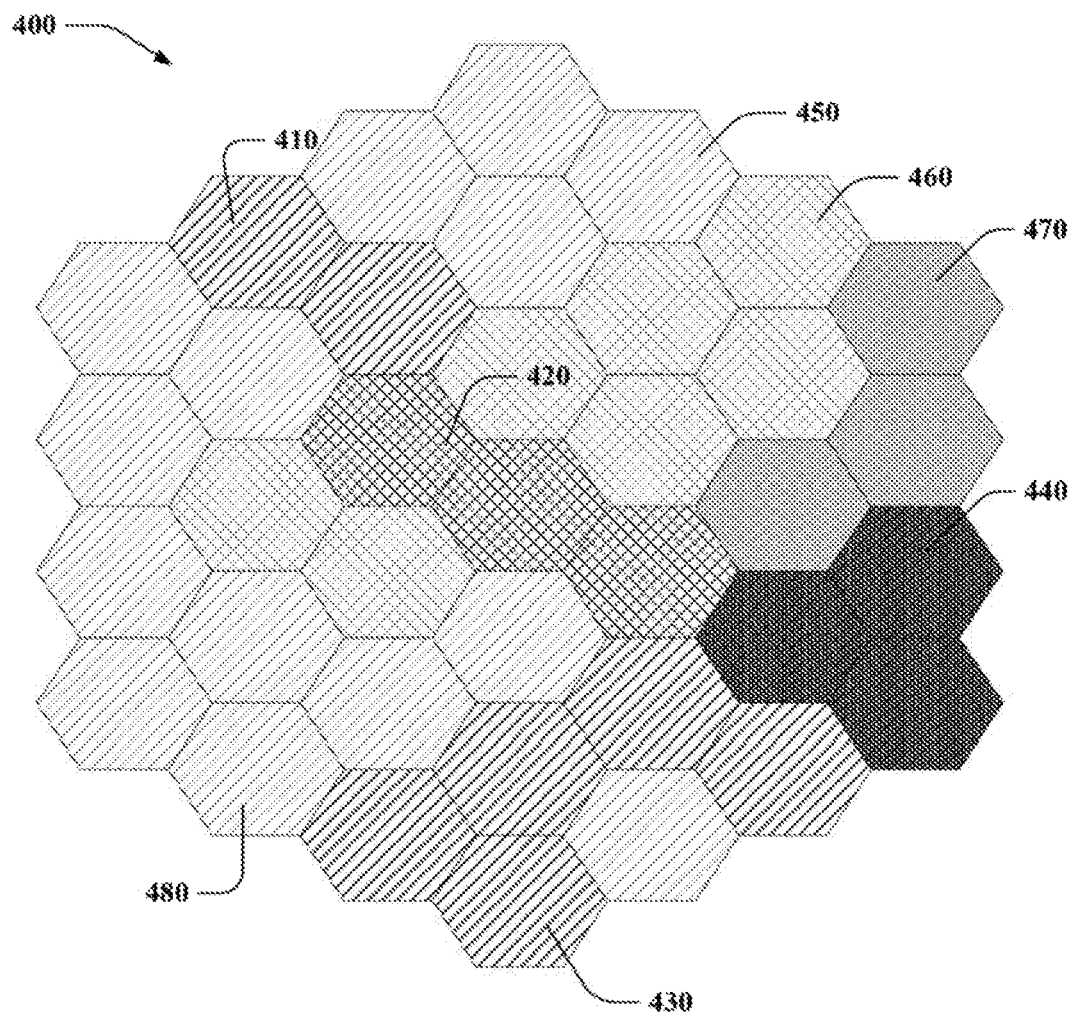
FIG. 4 illustrates a spectral activity map that includes estimated spectral activity indicators generated based on modeling in accordance with another example embodiment.

As shown in FIG. 3A, the area represented by the spectral activity map 300 may be broken up into regions 320 that evenly (or unevenly) divide the full volume of the area. As such, each of the regions 320 should be understood to represent a volumetric element of any suitable size and shape that provides the desired coverage. In the example of FIG. 3, the area may be broken up into a plurality of substantially equally sized hexagonally shaped areas when viewed from above. However, since the regions 320 have depth as well, in this example each of the regions 320 actually takes the shape of a hexagonal prism 322. Although only one such hexagonal prism 322 is explicitly shown in FIG. 3, it should be appreciated that each of the regions 320 may be represented in similar fashion to define a continuous volume from the surface of the earth up to a predetermined altitude that marks the upper limit of the volume that is represented. The upper limit could take any desirable value where data is capable of being gathered. However, for typical commercial applications, an upper limit from about 40,000 ft to about 45,000 ft may be common, with much higher upper limits being possible for military or other scientific applications.

The aircraft 100 may pass through a number of regions 320 in sequence to define a track 330 for the aircraft 100. Similarly, the second aircraft 320 may pass through of number of the regions 320 to define a track 332 for the second aircraft 310. The tracks 330 and 332 may or may not intersect with the same regions. In this example, an overlap region 334 is defined at an area at which the same regions are intersected by each of the tracks 330 and 332. As will be discussed in greater detail below, the overlap region 334 may provide an opportunity to increase the data received since such data comes from two different assets. Thus, accuracy of mapping in overlap regions may be expected to be improved in many cases.

In some embodiments, the regions 320 may be defined by coordinates of any suitable type. For example, Cartesian coordinates, polar coordinates, geographic coordinates, and/or the like, may be used to define the edges of the regions 320 and/or specific locations within any of the regions 320. However, in some cases, the coordinates used may be made in reference instead to a prominent feature in the area. For example, reference point 340 may be a mountain peak, or a tower, building or other structure that is prominent within the area. All locations within the area represented by the spectral activity map 300 could then be considered relative to the reference point 340 either in the absence of, or as a supplement to, the existence or usage of GPS positioning data.

One of the challenges faced when representing (or mapping) a 3D area is that the final representation medium (i.e., the spectral activity map 300) may be presented on a 2D display. Accordingly, the spectral activity map 300 may employ color coding, patterns, or other display options to facilitate representation of certain features on a 2D display that represent 3D information. One such display option may be the ability to access a regional display panel 342 that provides information in text form that relates to data that is correlated to the region 320. The regional display panel 342 may be a pop up that is displayed over the spectral activity map 300, off to a side of the spectral activity map 300, or as a separate page or window to which the viewer is redirected upon selection of one of the regions 320.

In some cases, the data provided in the regional display panel 342 may include a region identifier and/or an indication of the location reference to provide some form of identification and allow the viewer to have a frame of reference for how the regional display panel 342 correlates to the spectral activity map 300. In some cases, the regional display panel 342 may further include an operator 344 configured to enable the viewer to cycle to other regions directly within the regional display panel 342, and without having to select a different region on the spectral activity map 300.

Since each of the regions 320 of this example takes the shape of the hexagonal prism 322, it should be appreciated that the volume therein could be broken up into a series of hexagonal prisms that stack on top of each other to cover different elevation bands or altitude layers. Thus, in some cases, the regional display panel 342 may also include an indication of the altitude layer to which the information in the regional display panel 342 correlates. An operator 346 may also be selectable by the viewer to enable the viewer to cycle to other altitude layers directly within the regional display panel 342, and without having to select a different altitude layer on the spectral activity map 300.

As such, it should be appreciated that the spectral activity map 300 may include a number of selectable layers that can be cycled through or otherwise selected for display. The layers may be altitude layers, where the data associated with a given layer is specific to a physical strata and a limited portion of the 3D volume that is displayed. However, in other cases, the layers may be layers of information that can be added to or subtracted from a given display. For example, the information of FIGS. 3A, 3B, 3C and 4 may all be different layers where each layer adds some different characteristics or information that is not included on a preceding layer. As such, the viewer may be enabled to add as much information as desired to a particular display associated with the spectral activity map 300, or the viewer can drill down to the very specific information of interest to the viewer. The ability to display all pertinent information, and select the information that is considered to be pertinent, all from a single display, provides a significant advantage over conventional systems that have very rigid functions and display capabilities. Thus, example embodiments provide a technical solution for balancing robust capability for processing and display of spectral activity information with the ability of the viewer to select a level of simplicity or clarity that suits their needs or skill level.

Other data that may be included in the regional display panel 342 may include an indication of the frequency (or frequencies) detected at the corresponding location reference or at the region 320 along with an indication of the power level of the frequency detected. In some cases, the age of the data may also be indicated so that the viewer can appreciate any potential for inaccuracy of the data based on age. In some cases, the regional display panel 342 may include classification information for the corresponding region. For example, regions 320 could be classified based on the amount of potential interference that would be encountered in the region 320 and/or the consistency (by frequency, altitude layer, power level, etc.) of the data in the region 320.

In some embodiments, the regional display panel 342 may further include a confidence level association with the data represented therein. The confidence level may be related to the amount of data available, the type of data available, the reliability of the source of the data, the age of the data, consistency of the data, or any other suitable factors. The spectral activity indicator itself could also or alternatively indicate the confidence level (e.g., based on changing a characteristic of the pattern in terms of color, intensity, etc.). In some examples, the regional display panel 342 may further provide an indication as to whether the data provided therein is modeled data or actual data, or whether the data provided therein is generated based on modeled data or actual data.

The spectral activity map 300 may include indications of spectral activity in association with each of the regions 320 from the perspective of each asset in the region at any given instant in time. Thus, at each instant in time, two different assets may have corresponding different views or perspectives on the spectral activity in the area (or even in each region 320). By considering the perspectives of at least two assets and generating an image (i.e., a 3D image) of the spectral activity each respective asset sees (from its own perspective) at a given time, example embodiments may be configured to generate stereoscopic images of the area based on 3D image data referenced to two different locations at the same time, and determine a location of one or more signal sources based on the stereoscopic images. However, a different type of virtual stereoscopic image could also be generated using images determined by the same asset at two different times. Due to the rapid movement of the asset, the second view can be from a quite different perspective than the first view thereby creating the opportunity for employing stereoscopic techniques to again determine a location of a signal source. Signal sources 348 and 349 may be determined and displayed on the spectral activity map 300 via either of the methods described above in various embodiments.

Thereafter, stereoscopic techniques could also be employed to enable navigation to be conducted in hostile environments (i.e., GPS denial scenarios) using knowledge of the location of the signal sources 348 and 349. Phase information, angle of arrival, and any other suitable information for determining a direction from which a signal arrives at the antennas of the antenna assembly 110 may be used to facilitate use of stereoscopic techniques to generate location information. Thus, for example, if GPS is unavailable or unreliable, 3D images of the spectral activity in an area could be generated from different perspectives to determine the relative location of the signal sources 348 and 349.

The relative location to the signal sources 348 and 349 could then be used to determine the locations of the assets that provided the reference point for the different perspectives. As such, it may be possible in some cases to conduct navigation by the spectral activity map 300 by getting multiple fix locations based on distances and/or bearings from/to the signal sources 348 and 349. In some cases, phase information and angle of arrival, etc., may be used to determine locations of signal sources and be used for navigation without need for stereoscopy as well. If antenna configurations have been well characterized, it may be possible to perform spectral navigation with a single directive antenna receiving transmissions from a single source located at a known location. As such, for example, in GPS denial situations, or when GPS location determination accuracy is otherwise compromised, spectral navigation may be employed to enhance the accuracy of position determination.

However, spectral navigation could be used as a primary means of navigation in some cases. For example, an asset without other navigation means available (or flying stealthily through an area by avoiding any transmissions where GPS accuracy is compromised) may be enabled to compare historical spectral activity data to current spectral activity data to attempt to recognize regions that have particular characteristics and use their location as a means of navigation.

It should also be appreciated that various modes (e.g., navigation mode, mapping mode, interference mitigation mode, etc.) may be supported by example embodiments. Moreover, the layers of presentation may correspond to the modes, or vice versa. Thus, for example, in some cases, the navigation mode may be entered via a particular selectable layer or menu item disposed on the spectral activity map 300 or otherwise accessible to the viewer while utilizing the spectral activity map 300. Specific views, characteristics, and/or data (e.g., current or historical) may be displayed when corresponding modes or layers are selected.

In some cases, historical spectral data can be aggregated over specific time segments (i.e., hours, days, weeks, etc.) and the historical spectral data may allow patterns of spectral activity to be identified. For example, it may be determinable as to when a particular transmitter that operates intermittently will turn on and off, or change frequencies or patterns of operation. As such, historical spectral activity data may indicate the best time to transit a particular region to avoid interference, detection, or for other purposes. Historical spectral activity data may also identify the best times to use specific transmitters as aids to navigation (by spectral information), or the best times to find equipment operational or non-operational for other (e.g., military) purposes. Comparisons between historical and current spectral activity data may also be useful for navigation and/or situational awareness.

As mentioned above, the data gathered by the SAM 200 on each of the assets that passes through the regions 320 represented in the spectral activity map 300 may be aggregated or otherwise considered for generation of the spectral activity map 300. That data may then be used to present spectral activity indicators on the spectral activity map 300 in any suitable manner. The spectral activity indicators may provide a graphical indication of characteristics of the spectral activity associated with each volumetric element represented in the spectral activity map 300. In other words, the data gathered is used to generate a map that has spectral activity indicators thereon to tell the viewer something about the spectral activity in each region shown on the map based on data gathered by multiple assets. The spectral activity can therefore be appreciated by the viewer and, in some cases, actions can then be taken (automatically or responsively) to react to the situational awareness that can be provided relative to spectral activity. FIG. 3B illustrates an example in which data is indicated graphically for each region by providing an overlay or otherwise displaying the regions with a pattern that defines a classification or otherwise provides some graphical display of information about the data gathered in each respective region.

FIG. 3B shows the tracks 330 and 332 of the aircraft 100 and the second aircraft 310, respectively. However, the tracks 330 and 332 may either by layers of data that can be removed, or could alternatively not be displayed at all. They are shown here to facilitate a discussion of the spectral activity map 300 of this example. In this regard, regions 350, 352, 354, 356, 358, 360, 362 and 364 may be passed through by the second aircraft 310 in order while following the track 332. Meanwhile, regions 366, 360, 368, 370, 372 and 371 may be passed through by the aircraft 100 in order while following the track 330. As such, region 360 is common to both tracks 330 and 332. Other regions (including region 368) may be or may nearly be common to both tracks 330 and 332 due to one or the other of the tracks 330 and 332 passing very close to an edge of such regions.

As the SAM 200 of each asset gathers data along the respective tracks 330 and 332, the antennas of the antenna assembly 110 on each asset may receive various frequencies and such data may be recorded by the SAM 200. The data recorded by the SAM 200 may be offloaded to a common location (e.g., the spectral mapping module 600 of FIG. 6) at which the spectral activity map 300 may be generated. In the example of FIG. 3B, each region for which data is available may be overlaid or otherwise provided with a pattern that is indicative of characteristics of the data recorded by the SAM 200 (or SAMs) that passed through the region. The patterns are examples of spectral activity indicators that may be displayed in accordance with one example embodiment. However, it should be appreciated that other examples may utilize different spectral activity indicators. Moreover, the regional display panel 342 may also be considered to be a spectral activity indicator.

As noted above, the spectral activity indicators (i.e., the patterns in this example) may indicate characteristics of the data (i.e., the spectral activity information) recorded by the SAMs 200. The characteristics may include those mentioned above (i.e., those that could be included or displayed in the regional display panel 342), or other characteristics. Regions having similar measured characteristics may have the same spectral activity indicators (i.e., patterns in this example) associated therewith. Thus, for example, if the patterns are indicative of a frequency band at which interference is above a certain level, then each different pattern may indicate a corresponding different frequency band. However, as an alternative, the patterns may indicate an altitude at which interference is above a certain level so that each different pattern indicates a corresponding different altitude layer. As yet another alternative, each pattern may indicate a general or specific noise level measured in the corresponding region so that regions with the same pattern can be understood to have the same level of interference therein. Other display paradigms are also possible.

In the example of FIG. 3B, it can be appreciated that regions 350, 352, 362, 368, 370, 372 and 374 all have similar characteristics. Meanwhile, regions 354, 356 and 358 have similar characteristics to each other, but that are different than the characteristics of regions 350, 352, 362, 368, 370, 372 and 374. Similarly, regions 360, 364 and 366 have similar characteristics to each other, but that are different than the characteristics of regions 350, 352, 354, 356, 358, 362, 368, 370, 372 and 374. The differences in patterns indicate these relationships. However, it should be understood that color, intensity or other display characteristics could be substituted for the patterns in alternative embodiments. In any case, selection of each respective one of the regions may, as mentioned above, launch display of an instance of the regional display panel 342 that relates specific data for the corresponding regions.

In some embodiments, the age of the data represented by each respective pattern could be indicated by a change in a characteristic of the pattern. For example pattern 380 in FIG. 3C is faded to illustrate its advanced age relative to pattern 382, even though patterns 380 and 382 are otherwise indicative of the same (non-age related) characteristic(s). Similarly, pattern 384 is faded relative to pattern 386 to show that although these regions share the same (non-age related) characteristic(s), the region associated with pattern 384 has older data than the data of the region associated with pattern 386. The pattern 388 represents more recent data than the pattern 390, and the pattern 392 represents data older than that of patterns 394 and 396. Thus, for example, patterns may fade with age to indicate the age of the data upon which the respective patterns are based. Other display paradigms for indication of age could also be included.

In some cases, it may be desirable to not only present data for regions that have actually been visited (and had actual data measurements taken therein), but also to present data for regions that have not been visited. Accordingly, in some cases, modeling techniques may be employed (as discussed in greater detail below) to project or predict the data that would likely be experienced in regions not actually intersected by any asset track. The spectral activity map 400 provides spectral activity indicators (e.g., patterns 410, 420, 430 and 440) indicating characteristics of measurements taken in regions actually intersected by one of the tracks (330 and 332). However, the spectral activity map 400 may further include estimated spectral activity indicators for regions through which no assets have flown within at least a predetermined period of time. In this regard, for example, patterns 450, 460, 470 and 480 provide patterns indicating characteristics expected to exist (based on the model and the measured data), in those corresponding regions where actual data has not been measured. Thus, the patterns 450, 460, 470 and 480 are examples of estimated spectral activity indicators. In this example, patterns 410 and 430 indicate actual measurement of similar characteristics in the regions having those respective patterns. Meanwhile, pattern 420 indicates that regions having such pattern have the same characteristics as each other, but different characteristics than those of regions 410 and 430 based on actual measured data. Pattern 440 indicates that regions having such pattern have the same characteristics as each other, but different characteristics than those of regions 410, 420 and 430 based on actual measured data.

Patterns 450 and 480 are similar to the patterns 410 and 430, but have a different color, shade or intensity to indicate that the patterns 450 and 480 represent modeled data instead of actual data. However, it is estimated by the modeling technique employed, that measurements in the regions corresponding to patterns 450 and 480 would likely be similar to those measured in regions corresponding to patterns 410 and 430. Similarly, pattern 460 is similar to pattern 420, but has a different color, shade or intensity to indicate that the pattern 460 represents modeled data instead of actual data.

However, it is estimated by the modeling technique employed, that measurements in the regions corresponding to pattern 460 would likely be similar to those measured in regions corresponding to pattern 420. Pattern 470 is similar to pattern 440, but has a different color, shade or intensity to indicate that the pattern 470 represents modeled data instead of actual data. However, it is estimated by the modeling technique employed, that measurements in the regions corresponding to pattern 470 would likely be similar to those measured in regions corresponding to pattern 440. As noted above, any region could be selected to launch the regional display panel 342 for the corresponding region. The regional display panel 342 may also, as noted above, indicate whether the data displayed is modeled data or actually measured data.

FIG. 5, which is defined by FIGS. 5A, 5B and 5C, illustrates an example of how data measurement and generation may be accomplished in some example embodiments. In this regard, as noted above, the SAM 200 may be configured to periodically (or continuously) measure, record or otherwise monitor frequency information using the antenna assembly 110. Thus, for example, as the track 330 of the aircraft 100 passes through the volume of any one of the regions (e.g., hexagonal prism 322), the SAM 200 may record data at a first location 500, a second location 502, and a third location 504. Data recorded at each respective location may be associated with the specific location by GPS or any other location determining method. The data (e.g., spectral activity information) may be associated with a specific volumetric element that correlates to the location such that, for example, the spectral activity information measured at the first location 500 is considered to correlate to the first volumetric element 510, the spectral activity information measured at the second location 502 is considered to correlate to the second volumetric element 512, and the spectral activity information measured at the third location 504 may be considered to correlate to the third volumetric element 514. The data may then be aggregated (e.g., by normalizing or averaging the values of the measured spectral activity information) and assigned or otherwise correlated to either the entire volume 520 of the corresponding region, or to a portion (e.g., an altitude band 530) of the entire volume 520 of the corresponding region. Thus, for example, the aggregated data generated from all measurements taken in the region may be used to generate any patterns, colors, etc., that are used to represent characteristics of the data for the entire volume 520 or the portion of the entire volume. Moreover, if the region is selected or a portion of the region is selected, the aggregated data for the corresponding region or portion of the region may be displayed in the regional display panel 342. Accordingly, different levels of accuracy are available for display including region-based display accuracy and sub-region based display accuracy. For example, region-based display accuracy may exist where the whole region is characterized in one way based on all aggregated data considered (i.e., data received within a given time—fresh data). Meanwhile, sub-region based display accuracy may exist where smaller volumetric elements or portions of the entire volume 520 can be assigned characteristics individually based on the aggregated data that corresponds to the respective smaller volumetric elements. Moreover, in some cases, regions could be combined (and aggregated) to allow even a wider view of the spectral activity of a particular area. As a result, the ability exists for the viewer to zoom in or out with respect to the accuracy level desired for display.

The aggregation of data as described above may be performed by a spectral mapping module 600, as shown in FIG. 6. The spectral mapping module 600 may be located on any one of the assets, or on another component or platform that is in communication (or otherwise capable of sharing information) with the SAMs 200 of the system. Thus, for example, an instance of the spectral mapping module 600 may be provided at each aircraft and/or at one or more components of an ATG network (or other wireless communication network) in communication with such aircraft. Each instance may be enabled to operate independently or in continuous or periodic communication with other instances. Thus, it should also be appreciated that the spectral activity map 300/400 may be generated locally on the aircraft 100 (and/or second aircraft 310), or may be generated elsewhere and shared with the aircraft 100 (and/or second aircraft 310). The existence of the ATG network, if included, may enable real time communication of any applicable data between entities for near real time processing and calculation of any of the data/information described herein.

The spectral mapping module 600 may include processing circuitry 610 configured to perform data processing, control function execution and/or other processing and management services according to an example embodiment of the present invention. In some embodiments, the processing circuitry 610 may be embodied as a chip or chip set. In other words, the processing circuitry 610 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 610 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 610 may include one or more instances of a processor 612 and memory 614 that may be in communication with or otherwise control a device interface 620 and, in some cases, a user interface 630. As such, the processing circuitry 610 may be embodied as a circuit chip (e.g., an integrated circuit chip) configured (e.g., with hardware, software or a combination of hardware and software) to perform operations described herein. However, in some embodiments, the processing circuitry 610 may be embodied as a portion of an on-board computer. In some embodiments, the processing circuitry 610 may communicate with various components, entities and/or sensors of the ATG network or of assets operating in a particular area that is to be monitored and/or mapped for spectral activity.

The user interface 630 (if implemented) may be in communication with the processing circuitry 610 to receive an indication of a user input at the user interface 630 and/or to provide an audible, visual, mechanical or other output to the user. As such, the user interface 630 may include, for example, a display, mouse, speakers, keyboard, switches, indicator lights, buttons or keys (e.g., function buttons), and/or other input/output mechanisms.

The device interface 620 may include one or more interface mechanisms for enabling communication with other devices (e.g., modules, entities, sensors and/or other components of the ATG network or of the assets in the area that is to be monitored and/or mapped for spectral activity). In some cases, the device interface 620 may be any means such as a device or circuitry embodied in either hardware, or a combination of hardware and software that is configured to receive and/or transmit data from/to modules, entities, sensors and/or other components of the ATG network or of the assets that are in communication with the processing circuitry 610 (directly or indirectly).

The processor 612 may be embodied in a number of different ways. For example, the processor 612 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 612 may be configured to execute instructions stored in the memory 614 or otherwise accessible to the processor 612. As such, whether configured by hardware or by a combination of hardware and software, the processor 612 may represent an entity (e.g., physically embodied in circuitry—in the form of processing circuitry 610) capable of performing operations according to embodiments of the present invention while configured accordingly. Thus, for example, when the processor 612 is embodied as an ASIC, FPGA or the like, the processor 612 may be specifically configured hardware for conducting the operations described herein. Alternatively, as another example, when the processor 612 is embodied as an executor of software instructions, the instructions may specifically configure the processor 612 to perform the operations described herein.

In an example embodiment, the processor 612 (or the processing circuitry 610) may be embodied as, include or otherwise control the operation of the spectral mapping module 600 based on inputs received by the processing circuitry 610 responsive to receipt of spectral activity information from one or more of the SAMs 200. As such, in some embodiments, the processor 612 (or the processing circuitry 610) may be said to cause each of the operations described in connection with the spectral mapping module 600 in relation to receiving and processing spectral activity information and generating spectral activity maps responsive to execution of instructions or algorithms configuring the processor 612 (or processing circuitry 610) accordingly.

In an exemplary embodiment, the memory 614 may include one or more non-transitory memory devices such as, for example, volatile and/or non-volatile memory that may be either fixed or removable. The memory 614 may be configured to store information, data, applications, instructions or the like for enabling the processing circuitry 610 to carry out various functions in accordance with exemplary embodiments of the present invention. For example, the memory 614 could be configured to buffer input data for processing by the processor 612. Additionally or alternatively, the memory 614 could be configured to store instructions for execution by the processor 612. As yet another alternative, the memory 614 may include one or more databases that may store a variety of data sets responsive to receipt of spectral activity information from the SAMs 200. Among the contents of the memory 614, applications and/or instructions may be stored for execution by the processor 612 in order to carry out the functionality associated with each respective application/instruction. In some cases, the applications may include instructions for providing inputs to control operation of the spectral mapping module 600 as described herein.

In an example embodiment, the memory 614 may store the spectral activity map 300/400 or portions thereof. Alternatively or additionally, the memory 614 may store instructions for generation of the spectral activity map 300/400 based on various rules or triggers defined in the instructions. For example, the memory 614 may store instructions that define a number of updates from the SAMs 200 or a period of time after which an update to the spectral activity map 300/400 is to be performed. The memory 614 may further store instructions for defining how to store spectral activity information, how to aggregate or process such information, and/or how to represent such information on the spectral activity map 300/400.

The spectral mapping module 600 may be configured to receive spectral activity information that is registered to specific times and locations and aggregate the information with respect to each volumetric element (or portion thereof) as described above in reference to FIG. 5. However, the spectral mapping module 600 may employ one or more models or modeling modules that can be used to estimate current spectral information for areas where such information is aged beyond a certain level, or is missing. In some cases, models may also be used to estimate spectral information in future time based on past information and current situations. Certain receivers could be tuned to avoid interference or even turned off to avoid jamming or damage in anticipation of a situation that will be encountered in the future, or in response to currently changing situations.

Data received may be weighted with respect to aggregation based on the age of the data, the source of the data (e.g., some sources may be considered more reliable or consistent than others), or other factors. Aggregation of data (e.g., employing weighted averages of data received or normalizing such data) may then be conducted in accordance with strategies that are specific to the models used, and the models may be changed or selected by the viewer in some cases. The generation of spectral activity identifiers may then be conducted to graphically display spectral activity on the spectral activity map 300/400 in a desired way. Settings for how often identifiers are generated or updated, and for the characteristics employed for display of the identifiers may also be specific to the models employed.

As noted above, the spectral mapping module 600 may be configured to receive updates from the SAMs 200 in order to generate and/or update the spectral activity map 300/400. In some example embodiments, the SAMs 200 may store data (e.g., via processing circuitry similar in form and capability to that described above) onboard each respective asset (or some assets) until the asset lands or otherwise establishes a discrete connection to the spectral mapping module 600 in order to transfer the spectral activity information gathered by the SAM 200 to the spectral mapping module 600. However, in other example embodiments, the SAM 200 may remain in communication with the assets while the assets are in-flight and moving through the area. Thus, real time updates to the spectral activity map 300/400 may be conducted responsive to real time updated information being provided to the spectral mapping module 600. Moreover, real time distribution of the spectral activity map 300/400 may also be conducted, including to assets that are in-flight.

In some example embodiments, the spectral mapping module 600 of FIG. 6 may provide a mechanism via which a number of useful methods may be practiced. FIG. 7 illustrates a block diagram of one method that may be associated with the spectral mapping module 600 of FIG. 6. From a technical perspective, the spectral mapping module 600 described above may be used to support some or all of the operations described in FIG. 7. As such, the platform described in FIG. 7 may be used to facilitate the implementation of several computer program and/or network communication based interactions. As an example, FIG. 7 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., a network controller, a base station, the aircraft 100, the second aircraft 310, a communication/processing device on the aircraft 100 (or second aircraft 310), and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 7, may include receiving spectral activity information from one or more assets that have flown through an area at operation 700. The spectral activity information may be associated with location information indicating a respective location at which each portion of the spectral activity information was obtained. The method may further include associating the spectral activity information with respective volumetric elements that are each associated with respective portions of the area at operation 710, determining spectral activity indicators for each of the respective volumetric elements that has spectral activity information associated therewith at operation 720, and generating display data including the spectral activity indicators at operation 730.

In some embodiments, the method (and corresponding devices that may be configured to perform the method) may include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, the method may further include utilizing a model to provide estimated spectral activity indicators for one or more volumetric elements through which no assets have flown within at least a predetermined period of time at operation 725. Additionally or alternatively, the method may further include communicating the display data to one or more of the assets while the one or more of the assets remain in flight at operation 740. Additionally or alternatively, the method may further include determining a location of an asset within the area based on the spectral activity information at operation 750. Additionally or alternatively, the method may further include generating a virtual stereoscopic image of the area based on 3D image data referenced to two different locations, and determine a location of one or more signal sources based on the virtual stereoscopic image at operation 760.

In some cases, determining the spectral activity indicators may include aggregating, for each one of the respective volumetric elements, data measured for the each one of the respective volumetric elements and selecting a characteristic of each respective one of the spectral activity indicators based on the aggregated data. In an example embodiment, age of the data measured is indicated by a change in the characteristic provided on the display. In some cases, the characteristic may be indicative of a frequency band at which interference is above a predetermined level, indicative of an altitude at which interference is above a predetermined level and/or indicative of a power level of spectral activity measured. In an example embodiment, the spectral activity information may be received in real time from a plurality of assets in flight via an ATG communication network (as discussed below in reference to FIG. 8). In some cases, generating the display data may include generating a spectral activity map including the display data. In an example embodiment, the spectral mapping module may be disposed on one of the one or more assets in flight or at a ground location within the ATG communication network. In an example embodiment in which stereoscopic imaging is employed, the two different locations may be locations of two different assets at a same time or locations of the same asset at two different times.

FIG. 8 illustrates a functional block diagram of an ATG communication network 800 that may employ an example embodiment of the spectral mapping module 600 and/or SAMs 200. As shown in FIG. 8, the first BS 120 and second BS 122 may each be base stations of the ATG network 800. The ATG network 800 may further include other BSs 806, and each of the BSs may be in communication with the ATG network 800 via a gateway (GTW) device 810. The ATG network 800 may further be in communication with a wide area network such as the Internet 820 or other communication networks. In some embodiments, the ATG network 800 may include or otherwise be coupled to a packet-switched core network.

In an example embodiment, the ATG network 800 may include an instance of the spectral mapping module 600. However, the spectral mapping module 600 could alternatively be instantiated at the aircraft 100 (or other airborne assets), or at any of the BSs. Thus, for example, the SAMs 200 of any assets connected to the ATG network 200 may be enabled to provide real time updates regarding spectral activity information detected at their respective locations to the spectral mapping module 600. The spectral mapping module 600 may update the spectral activity map 300/400 and share (again in real time) such map with any assets connected to the ATG network 800.

In some cases, various assets (i.e., airborne assets) and components or devices of the ATG network 800 may automatically adjust their settings or operational characteristics based on spectral activity maps generated and shared via the ATG network 800. For example, devices that employ beamforming technology on the aircraft 100 or at the base stations 120/122 may adjust the frequencies used, to avoid interference that exists in certain regions. Moreover, estimating future tracks of assets and future interference values at the times that the tracks intersect various regions may further enable strategic formation of beams in either direction in future time to maximize the accuracy and minimize interference of beams formed in anticipation of a handover. The spectral activity map 300/400 may also show spectral white space in terms of specific altitude layers or frequencies that have low interference levels. Thus, for example, directions may be sent (e.g., by the spectral mapping module or another entity) to devices to shift communications to the white space in order to avoid interference.

Although not every element of every possible embodiment of the ATG network 800 is shown and described herein, it should be appreciated that the communication equipment on the aircraft 100 may be coupled to one or more of any of a number of different networks through the ATG network 800. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz. However, communications may be supported by other frequencies in licensed bands additionally or alternatively. Moreover, it may be possible to switch between licensed and unlicensed band communications (and/or satellite communications) in some cases. Additionally, in some cases, the ATG network 800 may be augmented by or operate in parallel with a satellite communication system.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A spectral mapping module comprising processing circuitry configured to:
   receive spectral activity information from one or more assets that have flown through an area, the spectral activity information being associated with location information indicating a respective location at which each portion of the spectral activity information was obtained;
   associate the spectral activity information with respective volumetric elements that are each associated with a continuous volume up to a predetermined altitude that divides respective portions of a full volume of the area;
   determine spectral activity indicators for each of the respective volumetric elements that has spectral activity information associated therewith; and
   generate display data including the spectral activity indicators.

2. The spectral mapping module of claim 1, wherein determining the spectral activity indicators comprises aggregating, for each one of the respective volumetric elements, data measured for the each one of the respective volumetric elements and selecting a characteristic of each respective one of the spectral activity indicators based on the aggregated data.

3. The spectral mapping module of claim 2, wherein age of the data measured is indicated by a change in the characteristic provided on the display.

4. The spectral mapping module of claim 2, wherein the characteristic is indicative of a frequency band at which interference is above a predetermined level.

5. The spectral mapping module of claim 2, wherein the characteristic is indicative of an altitude at which interference is above a predetermined level.

6. The spectral mapping module of claim 2, wherein the characteristic is indicative of a power level of spectral activity measured.

7. The spectral mapping module of claim 1, wherein the processing circuitry is further configured to utilize a model to provide estimated spectral activity indicators for one or more volumetric elements through which no assets have flown within at least a predetermined period of time.

8. The spectral mapping module of claim 1, wherein the spectral activity information is received in real time from a plurality of assets in flight via an air-to-ground (ATG) communication network.

9. The spectral mapping module of claim 8, wherein generating the display data comprises generating a spectral activity map including the display data such that the volumetric elements are substantially equally sized geometric shapes that represent respective geographic locations in the spectral activity map.

10. The spectral mapping module of claim 8, wherein the processing circuitry is further configured to communicate the display data to one or more of the assets while the one or more of the assets remain in flight.

11. The spectral mapping module of claim 10, wherein the spectral mapping module is disposed on one of the one or more assets in flight.

12. The spectral mapping module of claim 10, wherein the spectral mapping module is disposed at a ground location within the ATG communication network.

13. The spectral mapping module of claim 1, wherein the processing circuitry is configured to generate a virtual stereoscopic image of the area based on 3D image data referenced to two different locations, and determine a location of one or more signal sources based on the virtual stereoscopic image.

14. The spectral mapping module of claim 13, wherein the two different locations are locations of two different assets at a same time.

15. The spectral mapping module of claim 13, wherein the two different locations are locations of a same asset at two different times.

16. The spectral mapping module of claim 1, wherein the processing circuitry is further configured to determine a location of an asset within the area based on the spectral activity information.

17. The wireless communication network of claim 16, wherein the base stations communicate with the in-flight assets in real time to receive the spectral activity information and to provide the display data to the in-flight assets.

18. A wireless communication network comprising:
a plurality of base stations configured to communicate with one or more in-flight assets, each of the in-flight assets comprising a spectral activity monitor; and
a spectral mapping module configured to receive spectral activity information from the spectral activity monitor of each of the in-flight assets and generate display data based on the spectral activity information,
wherein the spectral activity information is associated with location information indicating a respective location at which each portion of the spectral activity information was obtained, and
wherein the spectral activity monitor is configured to associate the spectral activity information with respective volumetric elements that are each associated with a continuous volume up to a predetermined altitude that divides respective portions of a full volume of the area.

19. The wireless communication network of claim 18, wherein the spectral mapping module is disposed on one of the one or more in-flight assets.

20. The wireless communication network of claim 18, wherein the spectral mapping module is disposed at one of the base stations and wherein the display data generated by the spectral mapping module is provided to the one or more in-flight assets in real time.

* * * * *